United States Patent
Ripley

(10) Patent No.: US 7,305,086 B2
(45) Date of Patent: Dec. 4, 2007

(54) REDUCING PROBLEMS CAUSED BY VARIATIONS IN WATERMARK DETECTION RESULTS

(75) Inventor: Michael S. Ripley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 817 days.

(21) Appl. No.: 10/655,710

(22) Filed: Sep. 4, 2003

(65) Prior Publication Data

US 2005/0053238 A1   Mar. 10, 2005

(51) Int. Cl.
*H04N 7/167* (2006.01)
*H04L 9/00* (2006.01)

(52) U.S. Cl. ............ 380/203; 380/201; 380/202; 380/239; 380/241; 713/176; 713/177; 713/178; 713/179; 726/32; 726/33; 382/100; 382/232

(58) Field of Classification Search ......... 380/203; 713/176
See application file for complete search history.

(56) References Cited

U.S. PATENT DOCUMENTS

2003/0103645 A1* 6/2003 Levy et al. ............ 382/100
2005/0053238 A1* 3/2005 Ripley .................. 380/202

* cited by examiner

*Primary Examiner*—Syed A. Zia
*Assistant Examiner*—Longbit Chai
(74) *Attorney, Agent, or Firm*—Michael R. Barre

(57) ABSTRACT

Detection of watermarks in digital content by a system having a recording device and a playback device may be accomplished in such as a way as to improve the interoperability of the recording and playback devices. In one embodiment, a recording device having a first watermark detection component of a first sensitivity for detecting the watermark in digital content, interoperates with a playback device having a second watermark detection component of a second sensitivity for detecting the watermark in a digital content recording made by the recording device; such that the first sensitivity is more sensitive than the second sensitivity.

13 Claims, 2 Drawing Sheets

REDUCING PROBLEMS CAUSED BY VARIATIONS IN WATERMARK DETECTION RESULTS

BACKGROUND

1. Field

The present invention relates generally to content protection and security in computer and consumer electronics systems and, more specifically, to watermark detection.

2. Description

A number of systems for protecting content (e.g., against unauthorized copying) have been developed that employ watermarking as a part of the protection scheme. Watermarking is a technique whereby information is embedded into content in such a way that is generally transparent to users of the content, is difficult to remove from the content, and can be robustly detected in the content by specialized hardware or software. In some systems, the watermark data may indicate conditions and requirements constraining use of the content, including constraints specific to copying, with the intent that such information is robustly carried with the content when in an analog or unencrypted digital form. A recording device that is compliant with such a system may be required to detect the watermark in unencrypted content that is to be copied. If the watermark is present and indicates that a copy is not permitted, then the recording device does not make a copy. If the watermark is present and indicates that a copy is permitted, the recording device may be required to apply cryptographic protection (i.e., encryption) to any authorized copy of that content made by the recording device. In that case, compliant player devices may be required to detect the watermark in unencrypted recordings that are to be played, and stop playback if the watermark is detected (since such content either should not have been recorded, or should have been recorded in a cryptographically protected manner).

Unfortunately, real world properties of watermark technologies lead to challenging practical problems when watermarks are used in such a manner.

BRIEF DESCRIPTION OF THE DRAWINGS

The features and advantages of the present invention will become apparent from the following detailed description of the present invention in which.

DETAILED DESCRIPTION

An embodiment of the present invention is a system for overcoming practical problems in implementing watermark detection in recording and playback devices. In embodiments of the present invention, the sensitivities of a watermark detection component of a compliant recording device and a compliant playback device may be adjusted so as to reduce the likelihood of playback problems.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

One class of practical problems using watermarks in consumer electronics devices or computer systems can arise where detection of the watermark is non-deterministic or otherwise varies from one content protection implementation to another. Non-deterministic, as used herein, means that the content processed by one device might produce different results each time the content is processed, or that the content processed by one device produces different results than the same content processed by another device. For example, some schemes may call for watermark screening to occur at random intervals. In such cases, a given piece of content may be found by one content protection implementation to contain a watermark, and by another implementation (or that same implementation at a later time) to not contain the watermark. This causes problems if, for example, a recording device fails to detect a watermark and therefore records content in the clear, whereas a playback device detects the watermark in that same content and refuses to play the recording.

Inconsistent results in watermark detection may occur for various reasons. For example, in a given watermark detection system, there may be an allowance for variation of the precision of the arithmetic used in the watermark detection component. As a result, inconsistent detection results may computed in different devices if the computational precision of the recording and playback devices is different. In another example of processing content in the form of watermarked multiple channel audio data, in order to save manufacturing costs, a device manufacturer may provide a watermark detection component in a recording device that checks randomly across six channels of audio data or otherwise is less likely to detect a watermark. Another manufacturer of a playback device may provide a different watermark detection component that checks the six channels in another manner or otherwise is more likely to detect the watermark.

Figure 1:
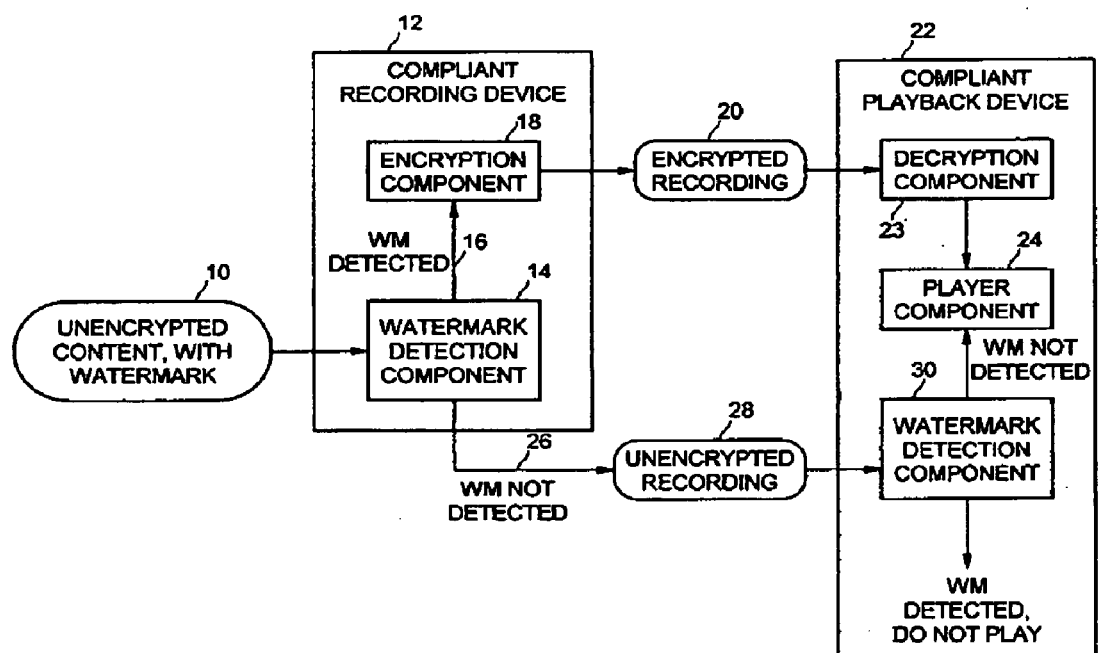
FIG. 1 is a diagram of known system using watermarks.

FIG. 1 is a diagram of a known system using watermarks that illustrates this problem. Content 10 may be unencrypted, with a watermark embedded within the content. When this content is read by a compliant recording device 12, a watermark detection component 14 will examine the content to attempt to detect a watermark. If a watermark is detected in the content by watermark detection component 14, then path 16 is taken and the recording device encrypts the content using encryption component 18 to produce encrypted recording 20. Encrypted recording 20 may then be read by a compliant playback device 22 using a decryption component 23 and a player component 24. The compliant playback device recognizes that the content is encrypted, and this takes precedence over checking for a watermark in the content. The player component decrypts the encrypted recording and renders the content for perception by a user.

If a watermark is not detected in the content by watermark detection component 14 of the compliant recording device (although the watermark is actually in the content), then path 26 is taken and the unencrypted content is not encrypted and a recording is made by the compliant recording device as unencrypted recording 28. The failure of the watermark detection component in the compliant recording device to detect the watermark in the content results in an assumption that the content may be redistributed in the clear. When unencrypted recording 28 is read by compliant playback device 22, the playback device recognizes that the content in the unencrypted recording is in the clear, so watermark detection component 30 of the compliant playback device attempts to find a watermark in the unencrypted content. If the watermark is not detected, then the player component 24 renders the unencrypted content. This content, from the point of view of the playback device, may be freely rendered and/or distributed. However, if a watermark is detected in the unencrypted recording by the watermark detection component of the compliant playback device, then the playback device does not render the content (assuming the watermark indicates a prohibition on copying or on playback of an unauthorized copy). Hence, a problem occurs when the compliant recording device does not detect the watermark, but the compliant playback device does.

Embodiments of the present invention address this problem probabilistically by differentiating the watermark detection capabilities associated with the compliant recording device and the compliant playback device. In particular, the watermark detection component in the compliant recording device used for controlling recording of content may be set to be more sensitive to the presence of watermarks, and the watermark detection component in the compliant playback device may be set to be less sensitive to the presence of watermarks. When the watermark detector in the recording device is more sensitive, it is more likely that the recording device will detect the watermark. For example, a recording device's watermark detection component may check for the watermark frequently when processing the unencrypted content, and a playback device's watermark detection component may check for the watermark less frequently. As a result, the likelihood of the problem described above occurring may be reduced, since it will occur only if the more sensitive watermark detector in the recording device misses a watermark and the less sensitive watermark detector in the playback device detects the watermark.

Figure 2:
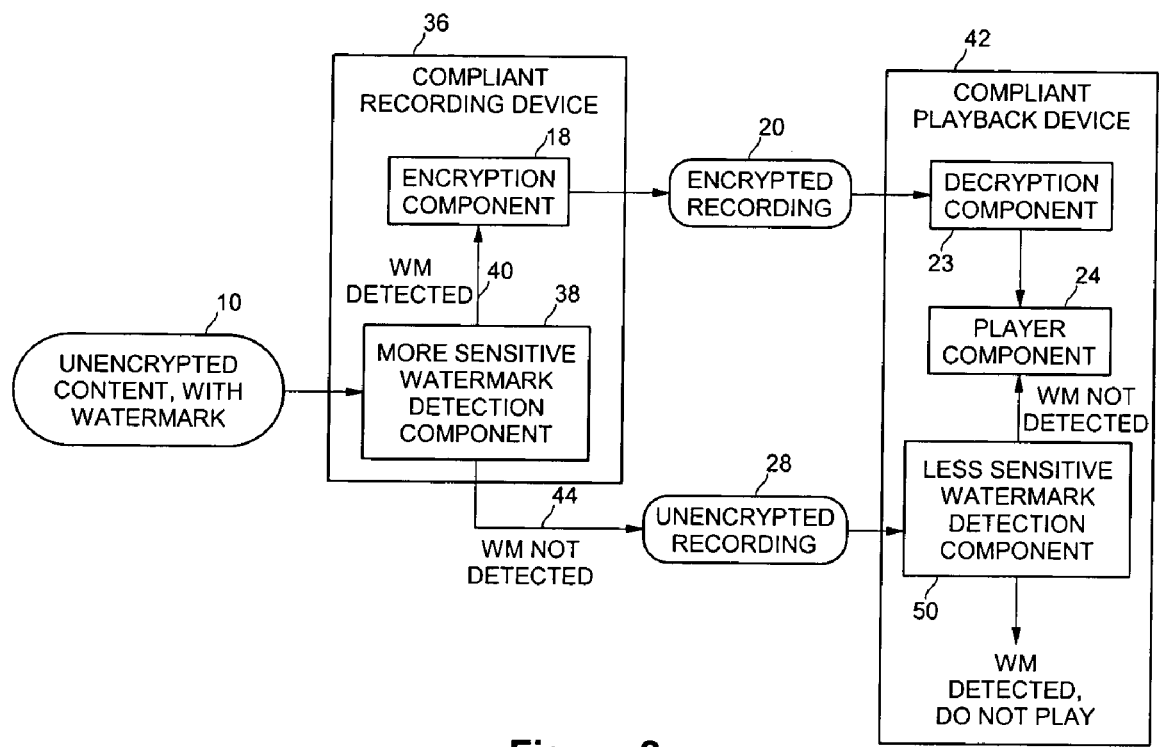
FIG. 2 is a diagram illustrating a system using watermarks according to an embodiment of the present invention.

FIG. 2 is a diagram illustrating a system using watermarks according to an embodiment of the present invention. In this embodiment, content 10 may be unencrypted, with a watermark embedded within the content as before. When this content is read by a compliant recording device 36, a new more sensitive watermark detection component 38 will examine the content to attempt to detect a watermark. If a watermark is detected in the content by sensitive watermark detection component 38, then path 40 is taken and the recording device encrypts the content using encryption component 18 to produce encrypted recording 20. Encrypted recording 20 may then be read by a compliant playback device 42 using a decryption component 23 and a player component 24 as before. The compliant recording device recognizes that the content is encrypted, and this takes precedence over checking for a watermark in the content. The player component decrypts the encrypted recording and renders the content for perception by a user.

If a watermark is not detected in the content by sensitive watermark detection component 38 of the compliant recording device (although the watermark is actually in the content), then path 44 is taken and the unencrypted content is not encrypted and a recording is made by the compliant recording device as unencrypted recording 28. The failure of the watermark detection component in the compliant recording device to detect the watermark in the content results in an assumption that the content may be redistributed in the clear. However, in embodiments of the present invention, since the watermark detection component 38 is more sensitive than traditional watermark detectors, the likelihood of missing the watermark is lower than before. When unencrypted recording 28 is read by compliant playback device 42, the playback device recognizes that the content in the unencrypted recording is in the clear, so less sensitive watermark detection component 50 of the compliant playback device attempts to find a watermark in the unencrypted content. If the watermark is not detected, then the player component 24 renders the unencrypted content. This content, from the point of view of the playback device, may be freely rendered and/or distributed. This is the likely path since the more sensitive watermark detector in the compliant recording device did not detect a watermark in the content.

If a watermark is detected in the unencrypted recording by the less sensitive watermark detection component 50 of the compliant playback device, then the playback device does not render the content. This outcome should be much less likely to occur in embodiments of the present invention than previous systems. Thus, the usability and interoperability of compliant recording and playback devices is increased. There is now a higher threshold for detection of "false positives" by the playback device.

In various embodiments, the sensitivity of the watermark detection components 38, 50 may be adjusted in different ways. For example, when the content is six channel audio data, the watermark detection component in the recording device may check more than one channel, or all channels at a time for the watermark, instead of just one of the channels. In another example, the watermark detection component in the recording device may check for the watermark more often than in previous systems. In yet another example, the tolerance or precision of computation used in watermark detection computations may be adjusted so that a watermark is more likely to be found by the recording device. In one embodiment, the sensitivity of the watermark detection component in the recording device may be adjusted so that the precision of the watermark detection computation is less than the precision used by the watermark detection component in the playback device. These adjustments are merely illustrative and it is contemplated that any adjustment in watermark detection sensitivity may be used and be within the scope of the present invention.

In one embodiment, the compliant recording device and the compliant playback device are integral.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for detection of a watermark in digital content, comprising:
    a recording device having a first watermark detection component of a first sensitivity for detecting the watermark in digital content; and
    a playback device having a second watermark detection component of a second sensitivity for detecting the watermark in a digital content recording made by the recording device;
    wherein the first sensitivity is more sensitive than the second sensitivity, in that the recording device checks the digital content for the watermark more often than the playback device checks the digital content for the watermark, or the recording device checks the digital content for the watermark with a computational precision less than a computational precision used by the playback device to check the digital content for the watermark:
    the recording device to make an unencrypted recording of the digital content for playback by the playback device when the watermark is not detected in the digital content and to make an encrypted recording of the digital content for playback by the playback device when the watermark is detected in the digital content; and
    the playback device to play the unencrypted recording when the watermark is not detected and to not play the unencrypted recording when the watermark is detected.

2. The system of claim 1, wherein the digital content processed by the recording device is unencrypted.

3. The system of claim 1, wherein the first sensitivity causes the first watermark detection component to check multiple channels of the digital content for the watermark when the digital content comprises multi-channel audio data.

4. The system of claim 1, wherein first sensitivity causes the first watermark detection component to check the digital content for the watermark more often than the second watermark detection component.

5. The system of claim 1, wherein the first sensitivity for the first watermark detection component causes the recording device to check the digital content for the watermark with a computational precision less than a computational precision of the second watermark detection component.

6. A method for processing unencrypted digital content in a recording device and for subsequent playback by a playback device comprising:
    performing, by a watermark detection component of the recording device, a detection operation for detecting a watermark in the unencrypted digital content, the detection operation being more sensitive for detecting the watermark than a detection operation of a watermark detection component of the playback device, in that the recording device checks the unencrypted digital content for the watermark more often than the playback device checks the unencrypted digital content for the watermark, or the recording device checks the unencrypted digital content for the watermark with a computational precision less than a computational precision used by the playback device to check the unencrypted digital content for the watermark;
    the recording device to make makifig an unencrypted recording of the unencrypted digital content for playback by the playback device when the watermark is not detected in the unencrypted digital content;
    the recording device to make an encrypted recording of the unencrypted digital content for playback by the playback device when the watermark is detected in the unencrypted digital content; and the playback device to play the recording when the watermark is not detected and to not play the recording when the watermark is detected.

7. The method of claim 6, wherein attempting to detect the watermark comprises checking multiple channels of the unencrypted digital content for the watermark when the unencrypted digital content comprises multi-channel audio data.

8. The method of claim 6, wherein attempting to detect the watermark comprises checking the unencrypted digital content for the watermark more often than the watermark detection component in the playback device.

9. The method of claim 6, wherein attempting to detect the watermark comprises checking the unencrypted digital content for the watermark with a computational precision less than a computational precision of the watermark detection component of the playback device.
    a watermark detection component for detecting a watermark in the digital content, the watermark detection component being more sensitive for detecting the watermark than a watermark detection component in the playback device.

10. An artical of manufacture comprising:
    a tangible, computer readable storage medium having a plurality of machine readable instructions, wherein when the instructions are executed by a processor, the instructions provide for processing unencrypted digital content in a recording device for subsequent playback by a playback device by performing, by a watermark detection component of the recording device, a detection operation for detecting a watermark in the unencrypted digital content, the detection operation being more sensitive for detecting the watermark than a detection operation of a watermark detection component of the playback device, in that the recording device checks the unencrypted digital content for the watermark more often than the playback device checks the unencrypted digital content for the watermark, or the recording device checks the unencrypted digital content for the watermark with a computational precision less than a computational precision used by the playback device to check the unencrypted digital content for the watermark;

making an unencrypted recording of the unencrypted digital content for playback by the playback device when the watermark is not detected in the unencrypted digital content; and making an encrypted recording of the unencrypted digital content when the watermark is detected in the unencrypted digital content; and wherein when the instructions are executed by the playback device, the instructions provide for the playback device to play the recording when the watermark is not detected and to not play the recording when the watermark is detected.

11. The article of claim 10, wherein instructions for attempting to detect the watermark comprise instructions for checking multiple channels of the unencrypted digital content for the watermark when the unencrypted digital content comprises multi-channel audio data.

12. The article of claim 10, wherein instructions for attempting to detect the watermark comprise instructions for checking the unencrypted digital content for the watermark more often than the watermark detection component in the playback device.

13. The article of claim 10, wherein instructions for attempting to detect the watermark comprise instructions for checking the unencrypted digital content for the watermark with a computational precision less than a computational precision of the watermark detection component of the playback device.

* * * * *